Patented Mar. 2, 1926.

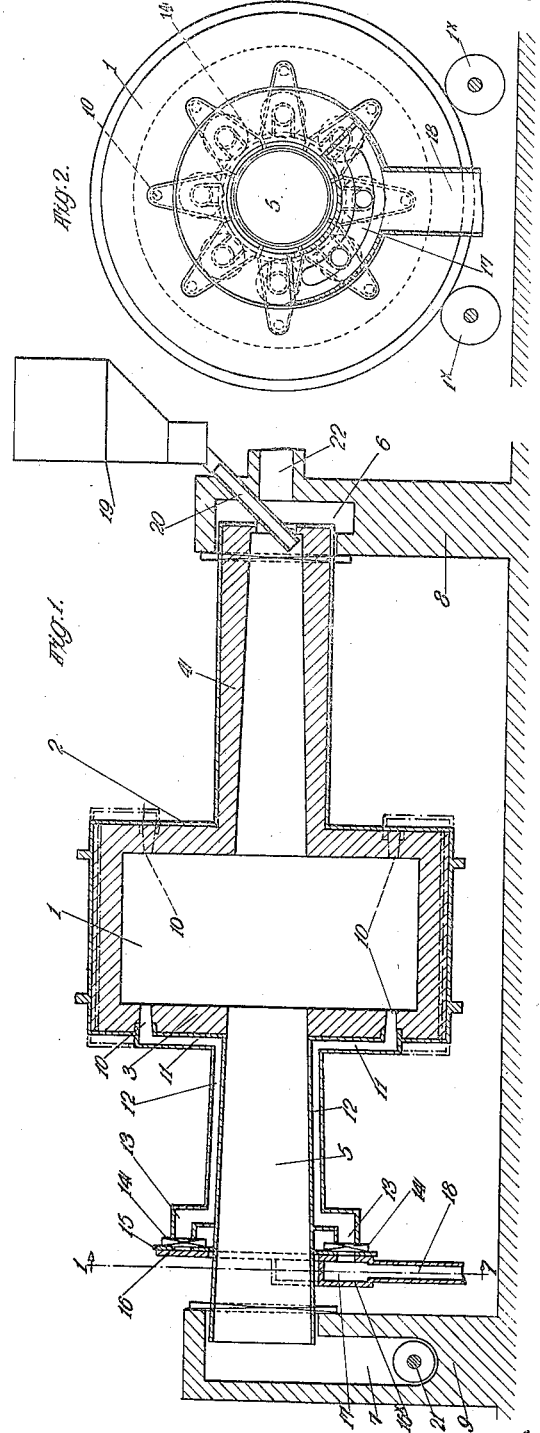

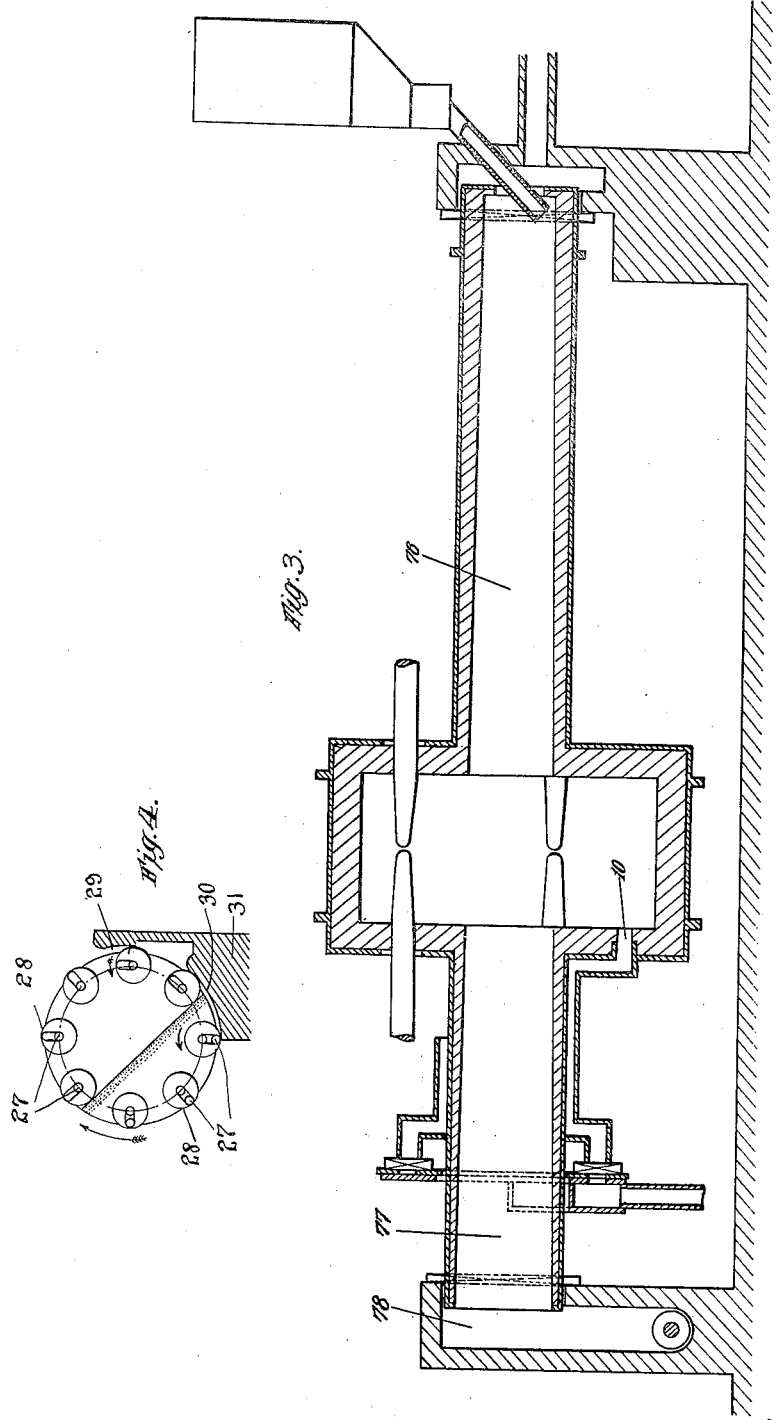

1,574,932

UNITED STATES PATENT OFFICE.

ADAM HELMER PEHRSON, OF STOCKHOLM, SWEDEN.

ROTARY FURNACE.

Application filed August 8, 1922. Serial No. 580,476.

*To all whom it may concern:*

Be it known that I, ADAM HELMER PEHRSON, a subject of the King of Sweden, residing at 14$^B$ Ostermalmsgatan, Stockholm, in the Kingdom of Sweden, have invented certain new and useful Improvements in or Relating to Rotary Furnaces, of which the following is a specification.

This invention relates to rotary furnaces and furnace systems in which provision is made for the introduction of aeriform or gaseous fluids into the charge for metallurgical, chemical and thermal purposes.

According to this invention the rotary furnace consists in the combination of three chambers one of which constitutes the main furnace chamber and the other two constitute integral coaxial tubular extensions therefrom of smaller diameter than the main furnace chamber and means whereby aeriform or gaseous fluid is introduced continuously through the charge in the main furnace chamber during its rotation or oscillation. The said means comprise a number of end openings or tuyères situated at such a distance from the centre of the main furnace chamber that during the rotation of the latter they are in turn covered by the charge. The aforesaid openings are suitably connected with a blast box or other appropriate device for supplying the aeriform or gaseous fluid thereto and means are provided whereby during the rotation of the furnace the said fluid is automatically allowed to pass through only those openings or tuyères which are in succession covered by the charge in the furnace, the arrangement being such that as those openings or tuyères which pass from a position where they are covered by the charge into a position where they are uncovered and are cut off from the supply of the aeriform or gaseous fluid the following openings or tuyères which become covered by the charge are placed into communication with the supply of aeriform or gaseous fluid without interruption so that the introduction of the aeriform or gaseous fluid through the charge takes place continuously during the rotation of the furnace. Further, the aforesaid chambers which constitute the tubular coaxial extensions of the main furnace chamber can be conveniently used as auxiliary furnace chambers one for receiving and passing the charge into the main furnace chamber and for the pretreatment of the charge during its passage therethrough and the other of said chambers for effecting the discharge of the furnace residues and also as a means for enabling the heat to be readily recovered from the furnace residues during their passage through the said chamber.

In the accompanying drawings the general arrangement is shown of furnaces embodying my invention.

Figure 1 illustrates in vertical section a horizontal rotary furnace constructed in accordance with my invention for the purpose of carbonization and generation of gas which with modifications may also be use for roasting or other treatment of ores and Figure 2 is an end sectional view of Figure 1, along the line 1—1 of Figure 1.

Figure 3 is a similar view showing an electrically heated furnace for use in the fixation of nitrogen, and Figure 4 is a diagrammatic end view of a furnace showing a modification of the device for operating the valves which control the flow of the aeriform or gaseous fluid to the tuyères.

Referring first more particularly to Figures 1 and 2, 1 is the main furnace chamber of drum like formation closed at both ends by walls 2, 3 which are formed or provided with the tubular coaxial extensions 4, 5 which lead to chambers 6, 7 formed in uprights 8, 9 and in which the extensions rotate with the main furnace chamber in a gas tight manner. The furnace 1 (and if necessary the extensions 4, 5) is supported on rollers 1$^x$ (see Figure 2) by which the main furnace chamber is rotated as is well understood. 10 are the tuyères arranged in the end walls 2, 3 of the main furnace chamber and at such a distance from the centre thereof that the openings of said tuyères are covered in turn by the charge in the main furnace chamber during the rotation thereof. The tuyères 10 communicate with the pipes 11 which in turn communicate with the pipes 12 which lie in contact with the periphery of the extension 5. The pipes 12 terminate at their outer ends in offset portions 13 which are connected by means of a spring pressure flange 14 to a face plate 15 which is provided with apertures which register with the opening in the spring pressure flanges 14. The face plate 15 rotates with the furnace in contact with another face plate 16 which is fixed and has an arc shaped opening 17 therein extending along a portion of its lower surface (see Figure 2). Thus, those tuyères which are in succession covered by the charge in the main furnace chamber communicate in succession with the said opening 17 and have admitted thereto the aeriform or gaseous fluid and after passing said opening are closed by the face plate 16 so that the aeriform or gaseous fluid is introduced through the charge in the main furnace chamber in a continuous manner and only through those tuyères which are at the time covered by the charge in the main furnace chamber. The face plate 16 is integral with a casing 16ˣ which constitutes a blast box to which the aeriform or gaseous fluid is led by the pipe 18. The material to be treated is introduced by the feed apparatus 19 through a tube 20 passing through the chamber 6 and into the extension 4. The residual materials or the treated burden are discharged from the opposite chamber 7 by a screw extractor device 21. The gases formed during the working of the main furnace chamber are extracted through the outlet 22. The operation of the main furnace chamber is briefly as follows:—The material to be treated is charged if desired in a preheated condition into the extension 4 and progresses towards and into the main furnace chamber 1 owing to the rotation thereof.

In the main furnace chamber the final treatment is given to the material except in such cases when condensable products have to be dealt with. In the case of dry or solid products the residual material is by means of rotation carried into one of the extensions and finally removed therefrom through the chamber contiguous thereto. When working with liquid materials the product may be tapped off through a suitable tap-hole from the main furnace chamber proper. For carbonizing purposes heat reducing gases may, with advantage, be used and can be introduced into the main furnace chamber through the said tuyères.

As a useful modification of the arrangement for the introduction of the aeriform or gaseous fluid to the main furnace chamber may be mentioned valves or cocks, operating automatically for example as shown in Figure 4. In this case a blast or gas box to which the aeriform or gaseous fluid is conducted is provided and which communicates with the tuyères by means of pipes which are capable of revolving about their ends and in which pipes is situated a ball valve adapted to open or close during certain periods of rotation of the furnace by suitable means such as is illustrated in Figure 4. In this case the pipes 25 are formed with disc shaped portions 28 adapted to come into contact with suitably shaped cam surfaces 29, 30 formed in a stationary part 31 contiguous to the main furnace chamber so that as the latter rotates the balls 27 are allowed to fall under the action of gravity to open the tuyères at a predetermined point during the rotation of the main furnace chamber.

Referring to Fig. 3 which shows the main furnace chamber for use in the fixation of nitrogen. The main furnace chamber in this case is electrically heated and the nitrogen or gases containing nitrogen are conducted to the charge therein through the tuyères which operate as previously described.

The operation is carried out as follows:—The material used for the fixing of the nitrogen together with the necessary fuel is charged into the extension 76 and finds its way into the main furnace chamber where gas, which is used for the purpose of preheating the charge, is produced. The fixation of the nitrogen is effected in the main furnace chamber, and the product is conveyed through the extension 77 into the discharging chamber 78.

What I claim and desire to secure by Letters Patent of the United States is:—

1. A rotary or oscillatory furnace consisting in the combination of three chambers one of which constitutes the main furnace chamber and the other two constitute integral coaxial tubular extensions therefrom having a smaller diameter than the main furnace chamber, and means whereby aeriform or gaseous fluid is introduced continuously through the charge in the main furnace chamber during its rotation or oscillation.

2. A rotary or oscillatory furnace consisting in the combination of three chambers one of which constitutes the main furnace chamber and the other two constitute integral coaxial tubular extensions therefrom having a smaller diameter than the main furnace chamber, means whereby aeriform or gaseous fluid is introduced longitudinally through the charge in the main furnace chamber, and electrical means for internally heating said main furnace chamber.

3. A rotary or oscillatory furnace consisting in the combination of three chambers one of which constitutes the main furnace chamber and the other two constitute integral tubular coaxial extensions therefrom having a smaller diameter than the main furnace chamber, means whereby aeriform or gaseous fluid is introduced longitudinally through the charge in the main furnace chamber, and resistance electrodes situated inside said main furnace chamber for internally heating said main furnace chamber.

4. A rotary or oscillatory furnace consisting in the combination of three chambers one of which constitutes the main furnace chamber and the other two constitute integral tubular coaxial extensions therefrom having a smaller diameter than the main furnace chamber, a number of end openings in said main furnace chamber for introducing aeriform or gaseous fluid through the charge therein and situated at such a distance from the centre that they are covered in turn by the charge in said main furnace chamber during its rotation or oscillation, and means for allowing the aeriform or gaseous fluid to pass through said openings as they become in succession covered by the charge in said main furnace chamber during its rotation or oscillation.

5. A rotary or oscillatory furnace consisting in the combination of three chambers one of which constitutes the main furnace chamber and the other two constitute integral tubular coaxial extensions therefrom having a smaller diameter than the main furnace chamber, said coaxial extension serving respectively as a charging and preheating chamber and a discharging chamber, and means whereby aeriform or gaseous fluid is introduced continuously through the charge in the main furnace chamber during its rotation or oscillation.

ADAM HELMER PEHRSON.